No. 729,778. PATENTED JUNE 2, 1903.
A. D. LUNT.
SYSTEM OF ELECTRICAL DISTRIBUTION.
APPLICATION FILED DEC. 18, 1899.
NO MODEL.

Witnesses.
Edward Williams, Jr.
Lewis E. Abell.

Inventor.
Alexander D. Lunt.
by Albert G. Davis
Atty.

No. 729,778. Patented June 2, 1903.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 729,778, dated June 2, 1903.

Application filed December 18, 1899. Serial No. 740,631. (No model.)

*To all whom it may concern:*

Be it known that I, ALEXANDER D. LUNT, a citizen of the United States, residing at Schenectady, county of Schenectady, State of New York, have invented certain new and useful Improvements in Systems of Electrical Distribution, of which the following is a specification.

My present invention relates to alternating-current systems, and in some of its features more especially to that type of system in which the direct-current end of a converter feeds a three-wire direct-current system the neutral conductor of which is led back and connected to a point of neutral potential on the alternating-current-supply system.

The improvements comprised in the system to be described render possible the use of a small number of transformers in the alternating-current-supply system, thus cheapening the cost of construction and somewhat reducing the complication of connections.

Other advantages flowing from my invention will be understood by reference to the following detailed description, taken in connection with the accompanying drawings, while its scope will be particularly pointed out in the claims appended hereto.

Figure 1:
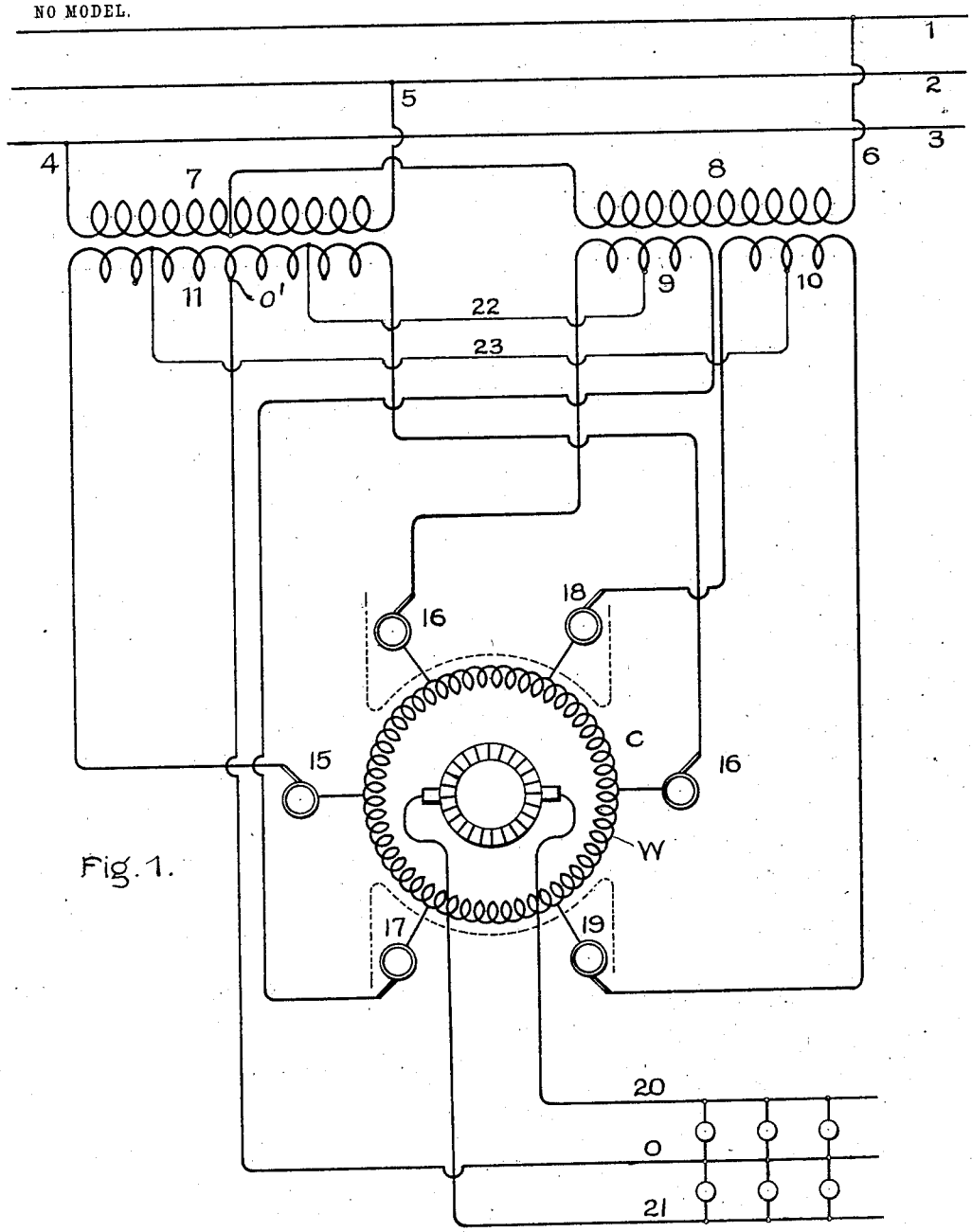
Figure 2:
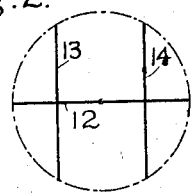

In the drawings, Figure 1 is a diagrammatic representation of a system embodying my invention, while Fig. 2 is an explanatory diagram.

The drawings are intended to represent diagrammatically the conversion of three-phase alternating current into direct current, the operation taking place through the instrumentality of a rotary converter of a given number of phases upon which electromotive forces having a different phase relation are impressed. In the particular means shown the three-phase current is first supplied to a phase-changing transformer in the secondary windings of which quarter-phase electromotive forces are generated. The three-phase mains are shown at 1 2 3, connected to which are leads 4 5 6 of two interconnected transformers the primaries of which are shown at 7 8. The primary 8 has one terminal only connected to the three-phase mains, the other being connected to the middle point in the length of the primary winding 7, while, on the other hand, the winding 7 has both of its terminals connected to corresponding mains of the three-phase system. The winding 8 has a number of turns somewhat less than that of the winding 7 and, more definitely speaking, in the proportion of $\sqrt{3}:2$. As thus arranged the fluxes induced in the cores of the transformers will bear a quarter-phase relation to each other, as is well understood in the art. As a consequence the electromotive forces generated in the secondary windings of the transformers will have a like relation. As shown, the primary 8 is provided with two secondary windings, (indicated at 9 10,) while the primary 7, on the other hand, is provided with but a single winding, (indicated at 11.) The six terminals of these three secondary windings are connected to the six collector-rings of a six-phase rotary converter, (indicated at C,) and in order that the currents supplied to the converter may have the proper magnitudes to generate six-phase magnetomotive forces therein, as is required for its proper operation, these windings must be proportioned as to number of turns in a manner represented theoretically by the electromotive-force diagram designated as "Fig. 2." The dotted circle represents the locus of the ends of the vector electromotive forces combined to produce resultant six-phase currents. The line 12 connects points in the dotted circle displaced by one hundred and eighty degrees, while the lines 13 14, both of which are at right angles to the line 12, each connects points on the dotted circle separated by one-third of the circumference. With this arrangement of lines or of electromotive forces which the lines represent the circle will be divided into six equal parts, each subdivision being connected to a line representing an electromotive force. If the dotted circle be supposed to represent an armature-winding of a rotary converter, while the lines shown be considered to represent sources of electromotive force of the phase relation and magnitude indicated, then by reason of the connections between the sources of electromotive forces afforded by the armature-winding resultant currents will flow in the armature-winding bearing a six-phase relation to each other corresponding to the six-phase connection of the sources of electromotive force. In accordance with this plan of operation the secondary 11 of one of the supply-transformers heretofore referred to is made with a number of turns corresponding to the maximum alternating electromotive force which it is desired to impress upon the rotary converter. The terminals of this secondary are connected to collector-rings 15 16, which in turn are connected to diametrically opposite points of the armature-winding W. This connection corresponds to the representation of the electromotive force 12 in its inscribing circle in Fig. 2 referred to. Having chosen a certain magnitude for the electromotive force of the secondary 11, it is necessary that the secondaries 9 and 10 be suitably proportioned in order to properly coöperate therewith to produce resultant six-phase currents. To this end the electromotive force of each of these secondaries should bear to that of the secondary 11 the same proportion as that existing between the electromotive forces 13 and 12 represented in Fig. 2. From the geometry of the figure this proportion is as $\sqrt{3}:2$. In showing the respective numbers of turns of the secondary windings it has not been possible in the drawings to represent this relation exactly, but some approximation thereto has been made.

The terminals of the secondary 9 in accordance with the diagram in Fig. 2 are connected to points of the converter-armature displaced by one-third of the polar pitch, the points of connection being such as to bring the point of entrance of the current of the secondary 11 midway between them. This is shown at 16 17 in the drawings. In a similar manner the secondary 10 is connected to points 18 and 19, each of which is separated from the tap leading to the opposite end of the secondary 11 by an angle corresponding to one-sixth of the polar pitch, the points 18 and 19 being thus separated from each other by one-third of the polar pitch. As thus arranged six-phase currents will circulate in the armature-winding of the converter C, by reason of which in the ordinary manner direct currents are generated and, as indicated in Fig. 1, are transmitted to direct-current mains 20 and 21. In the drawings the commutator, for clearness of illustration, is shown as disconnected from the armature-winding; but it is to be understood that in practice the ordinary connections will be made.

A neutral conductor O is shown as coöperating with the direct-current mains 20 and 21 to form a three-wire system of direct-current distribution, this conductor being led back and connected to a point of neutral potential on the alternating-current system. This point is represented by the center of the inscribing circle, (shown in Fig. 2,) and as this point lies upon the middle of the line 12, representing an electromotive force, it will be seen that the point of neutral potential on the alternating-current-supply system of Fig. 1 is found by tapping into the middle of the length of the secondary 11, since in carrying out the plan of operation indicated in Fig. 2 the coil 11 was taken to represent the electromotive force 12. The neutral conductor O is therefore brought back and connected to the point O' in the secondary 11.

Although I have spoken of proportioning the turns of the secondaries 9, 10, and 11 in accordance with the relations of the electromotive forces indicated in Fig. 2, it is to be understood that I have done so on the assumption that the volts per turn are equal. If the contrary is the case, the secondaries must be proportioned in such manner that the electromotive forces generated in the coils are in proper proportion to each other, as represented in Fig. 2, the relation of electromotive forces being the real result to be obtained and not the relation of turns, which is, generally speaking, only an indication of the amount of electromotive force.

In the drawings the connections of the rotary converter are those corresponding to a bipolar field; but it will be understood that these are to be correspondingly changed where a mulipolar structure is employed, as is usual in practice.

When the sources of quarter-phase currents 9, 10, and 11 are connected to a translating device, such as a rotary converter, it will be evident that the circuits of the rotary-converter armature serve to interlink the electromotive forces of the windings 9, 10, and 11 in the desired topographical relation to each other. If the windings were not interlinked, it is evident that no difference of potential would exist between a main leading from one of the windings—as, for example, the winding 9—and a main leading from another winding, such as the winding 10 or 11. Instead of depending upon the connections of the windings to the rotary converter or other translating device as a means for interlinking the voltages of the supply system I may make suitable permanent connections between the sources of current of different phase, the nature of which will be best understood by reference to Fig. 2, in which, for example, the lines 13 and 12 represent, respectively, intersecting electromotive forces of secondary windings of different phase. This intersection forms a point of equipotential, and the secondaries whose electromotive forces are represented by these lines may consequently be connected together at corresponding points without normally causing flow of current between the same. Thus the line 22 connects the middle point of the secondary 9 with a point in the winding 11 located one-quarter of the distance from its end. This connection so far completes a circuit or circuits as to enable resultant current to flow when terminals of the secondaries are connected in circuit where without this connection no current would result. In a similar manner the middle point of the secondary 10 is connected by a conductor 23 with a point in the secondary 11 located one-quarter of the distance from its opposite end, this connection corresponding to the connection of points on the lines of electromotive force 12 and 14 represented by the intersection of these lines. By reason of these equipotential connections 22 and 23 six-phase electromotive forces exist upon the terminals of the secondary windings 9, 10, and 11 regardless as to whether translating devices are in circuit or not.

What I claim as new, and desire to secure by Letters Patent of the United States, is—

1. The combination of three transformer-windings, means for generating electromotive forces of the same phase in two of the windings, means for generating in the other winding an electromotive force bearing a quarter-phase relation to the electromotive forces in the first two windings, and a six-phase alternating-current dynamo-electric machine supplied with current from said windings.

2. The combination of three transformer-windings, means for generating electromotive forces of the same phase in two of the windings, means for generating in the other winding an electromotive force having a quarter-phase relation to the electromotive forces in the first two windings, and conductors tying said windings together in such manner as to cause six-phase electromotive forces to exist on mains leading from said windings.

3. The combination of a dynamo-electric machine, a system of conductors upon which quarter-phase electromotive forces are maintained, connections between a pair of conductors of one phase and points in a winding of said machine displaced by one-half the polar pitch, and connections between a pair of conductors of another phase and points in a winding of said machine displaced by one-third of the polar pitch.

4. The combination of a dynamo-electric machine, a system of conductors upon which quarter-phase electromotive forces are maintained, connections between a pair of conductors of one phase and points in a winding of said machine displaced by one-half the polar pitch, and connections between a pair of conductors of another phase and points in a winding of said machine displaced by one-third of the polar pitch.

5. The combination of a dynamo-electric machine, a system of conductors upon which quarter-phase electromotive forces are maintained, connections between a pair of conductors of one phase and points in a winding of said machine displaced by one-half the polar pitch, and connections between a pair of conductors of another phase and points in a winding of said machine displaced by less than half the polar pitch.

6. The combination of a rotary converter having a number of phases represented by a multiple of three, transformer-windings carrying quarter-phase currents, and conductors connecting all of said windings to the armature of said converter, the points of connection of one of said windings being displaced from each other by an angle different from the angle between the points of connection of another of said windings.

7. The combination of an alternating-current dynamo-electric machine of a number of phases represented by a multiple of three, transformer-windings carrying quarter-phase currents, conductors connecting one of said windings to said dynamo-electric machine at points displaced one-half of the polar pitch, and conductors connecting another of said windings to said dynamo-electric machine at points displaced one-third of the polar pitch.

8. The combination of a rotary converter, transformer-windings, two of which carry currents of the same phase while a third carries current having a quarter-phase relation to the currents in the first two windings, and connections between the terminals of all of said windings and said converter.

9. The combination of a rotary converter, three transformer-windings, two of which carry currents of the same phase while the third carries current having a quarter-phase relation to the currents in the first two windings, and connections between all of said windings and said converter, the connections for the third winding being such as to embrace an arc equal to one-half the polar pitch.

10. The combination of a rotary converter, three transformer-windings, two of which carry currents of the same phase while the third carries current having a quarter-phase relation to the currents in the first two windings, connections between all of said windings and said converter, the connections for the third winding being such as to embrace an arc equal to one-half the polar pitch, and a neutral conductor leading from the middle point of the third winding.

11. The combination of a rotary converter, transformer-windings carrying quarter-phase currents, conductors connecting one of said windings to the armature of said converter at points displaced by one-half of the polar pitch, and conductors connecting other windings to points in the converter-armature displaced by less than half the polar pitch.

12. The combination of a rotary converter, transformer-windings carrying quarter-phase currents, conductors connecting one of said windings to the armature of said converter at points displaced by one-half of the polar pitch, a neutral conductor connected to an intermediate point in the last-mentioned winding, and conductors connecting other windings to points in the converter-armature displaced by less than half the polar pitch.

13. The combination of a rotary converter, transformer-windings carrying quarter-phase currents, conductors connecting one of said windings to the armature of said converter at points displaced by one-half of the polar pitch, a neutral conductor connected to an intermediate point in the last-mentioned winding, and conductors connecting other windings to points in the converter-armature displaced by one-third the polar pitch.

14. The combination of separate sources of quarter-phase electromotive force and conductors connecting equipotential points in said sources.

15. The combination of three windings generating quarter-phase electromotive forces, two of said windings being of the same phase, and connections between the middle points respectively of the windings, last mentioned, and separate points in the other winding.

16. The combination of three windings generating quarter-phase electromotive forces, two of said windings being of the same phase and connections between the middle points respectively of the windings last mentioned, and separate points in the other winding, located substantially one-half the distance between its middle point and its ends.

In witness whereof I have hereunto set my hand this 15th day of December, 1899.

ALEXANDER D. LUNT.

Witnesses:
BENJAMIN B. HULL,
MABEL E. JACOBSON.